(12) United States Patent
Zajac et al.

(10) Patent No.: US 12,034,788 B2
(45) Date of Patent: Jul. 9, 2024

(54) MOBILE PEER-TO-PEER NETWORKS AND RELATED APPLICATIONS

(71) Applicant: WARNER BROS. ENTERTAINMENT INC., Burbank, CA (US)

(72) Inventors: William Zajac, La Crescenta, CA (US); Prashant Abhyankar, Los Angeles, CA (US); Gregory I. Gewickey, Simi Valley, CA (US); Rana Brahma, Los Angeles, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 161 days.

(21) Appl. No.: 17/439,350

(22) PCT Filed: Mar. 13, 2020

(86) PCT No.: PCT/US2020/022826
§ 371 (c)(1),
(2) Date: Feb. 8, 2022

(87) PCT Pub. No.: WO2020/186250
PCT Pub. Date: Sep. 17, 2020

(65) Prior Publication Data
US 2022/0201056 A1 Jun. 23, 2022

Related U.S. Application Data

(60) Provisional application No. 62/818,551, filed on Mar. 14, 2019.

(51) Int. Cl.
*G06F 15/173* (2006.01)
*H04L 65/612* (2022.01)
(Continued)

(52) U.S. Cl.
CPC .......... *H04L 65/612* (2022.05); *H04L 67/02* (2013.01); *H04L 67/1061* (2013.01);
(Continued)

(58) Field of Classification Search
CPC ......... H04L 65/62; H04L 57/51; H04L 67/52; H04L 67/568; H04L 67/02; H04L 67/1061; H04L 67/306
(Continued)

(56) References Cited

U.S. PATENT DOCUMENTS

| 6,769,127 B1* | 7/2004 | Bonomi | H04N 21/2221 348/E7.071 |
|---|---|---|---|
| 2008/0095163 A1* | 4/2008 | Chen | H04W 84/18 370/392 |

(Continued)

FOREIGN PATENT DOCUMENTS

WO  WO 2018/195323 A1  10/2018

OTHER PUBLICATIONS

EP, Extended European Search Report, Jan. 11, 2023.
WO, PCT/US2020/022826 ISR and Written Opinion, Sep. 23, 2020.

*Primary Examiner* — Alan S Chou
(74) *Attorney, Agent, or Firm* — Bookoff McAndrews, PLLC

(57) ABSTRACT

A computer-implemented method for peer-to-peer (P2P) networks for the delivery of media content held in the peer-to-peer network to a vehicle in a local subgroup of the P2P network, and for providing an automated process for P2P networks for transferring of physical articles or electronic data package between vehicles traveling different routes.

20 Claims, 10 Drawing Sheets

(51) Int. Cl.
*H04L 67/02* (2022.01)
*H04L 67/1061* (2022.01)
*H04L 67/306* (2022.01)
*H04L 67/51* (2022.01)
*H04L 67/52* (2022.01)
*H04L 67/568* (2022.01)

(52) U.S. Cl.
CPC ............ *H04L 67/306* (2013.01); *H04L 67/51* (2022.05); *H04L 67/52* (2022.05); *H04L 67/568* (2022.05)

(58) Field of Classification Search
USPC .......................................... 709/224
See application file for complete search history.

(56) References Cited

U.S. PATENT DOCUMENTS

| | | | |
|---|---|---|---|
| 2013/0091212 A1* | 4/2013 | Rajakarunanayake | ...................... H04L 67/63 709/204 |
| 2015/0032328 A1* | 1/2015 | Healey | ................... B60Q 1/544 701/36 |
| 2016/0054905 A1* | 2/2016 | Chai | .................... H04N 21/482 715/719 |
| 2018/0205682 A1 | 7/2018 | O'Brien, V et al. | |
| 2018/0281657 A1 | 10/2018 | Healey et al. | |
| 2018/0374126 A1* | 12/2018 | Patil | ...................... B60W 40/08 |
| 2019/0313224 A1* | 10/2019 | Yu | ........................... H04L 67/12 |

\* cited by examiner

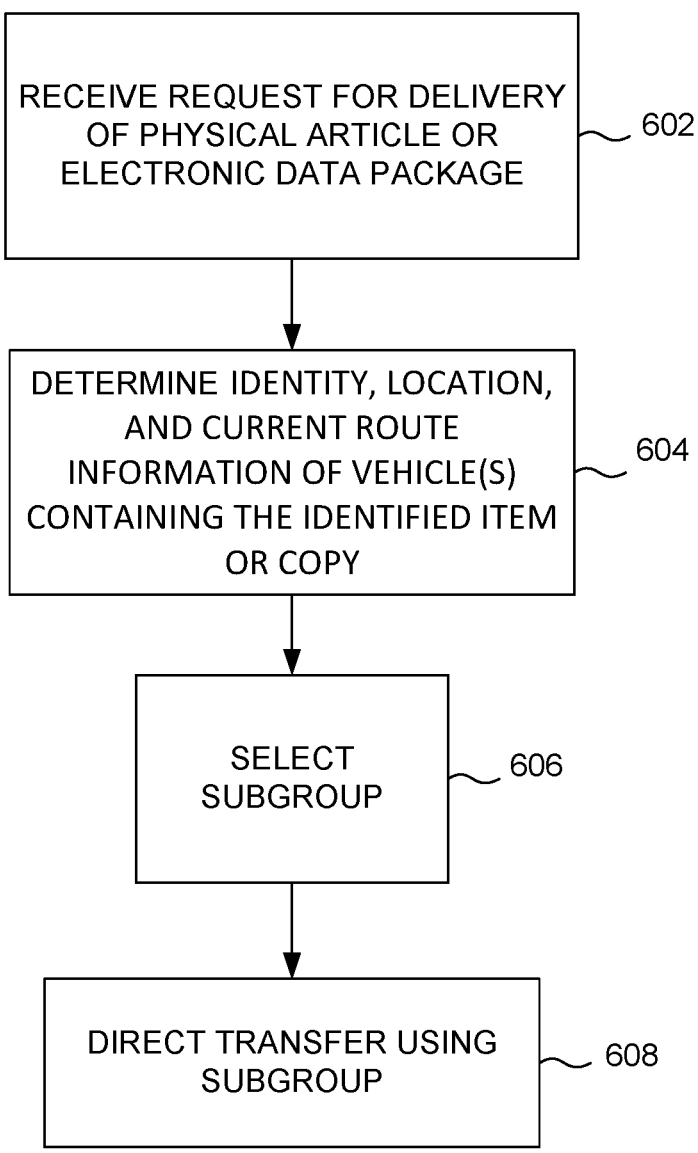

MOBILE PEER-TO-PEER NETWORKS AND RELATED APPLICATIONS

CROSS-REFERENCE TO RELATED APPLICATION

The present application IS A 371 OF International Application Serial No. PCT/US2020/022826, filed Mar. 13, 2020, which claims priority to U.S. Provisional Patent Application Ser. No. 62/818,551 filed Mar. 14, 2019, both of which are incorporated herein in their entireties by reference.

FIELD

The present disclosure relates to methods and systems for mobile peer-to-peer networks and related applications.

BACKGROUND

Online ordering and purchasing are prominent activities in commercial and entertainment transactions. With this, rapid and reliable delivery is a critical factor in consumer decisions. In entertainment, for example, viewers don't want to go to a store to pick a movie DVD, but rather order a movie on-demand to watch instantly on their device of choice. People are more active and more in motion, traveling from place to place, most times in groups of friends or family. Often, the vehicles are equipped with technologies and applications that tap into a wireless network, including the Internet, to provide benefits to the travelers, including the drivers and the passengers. The passengers' personal devices, for example, smart phones, are often upgraded to include more advanced technologies, storage capacity and computational power. However, producers and distributors of electronic content have not taken full advantage of current and anticipated future technologies in the delivery of electronic content and physical goods to the users, especially to those traveling in vehicles or other conveyances.

Media content is an important form of electronic content. As used herein, "media content" means information arranged in a communication medium for consumption by a person. In the context of a computer network, media content always takes a digital electronic form while in the network, and takes other forms (e.g., analog electrical, optical, acoustic, or mechanical signals) before entering the network or after exiting the network via an output device. To be human-perceivable, information must be arranged in a human-perceivable medium using an output device (e.g., a display system, acoustic system, tactile output system, force output system, or olfactory output system.) Hence, media content when in electronic form is arranged to produce a human-perceptible output when provided to an output device.

Vehicles are a form of human conveyance that can take various forms: cars, trucks, busses, vans, rail cars, ships, boats, and so forth. As noted above, more people in motion carrying their mobile communication devices creates demand and opportunity for new forms of media content to be delivered to networks of mobile nodes: higher bandwidth (e.g., 5G) content, new interactive games, in augmented reality and otherwise; and new platforms for social cooperation leveraging mobile networks for delivery of good, services, and social experiences. Existing P2P networks and applications fail to make good use of the new modalities for communication and transactions.

It would be desirable, therefore, to develop new methods and systems for the delivery of media content and physical articles held in the network to users traveling conveyances, that overcome these and other limitations of the prior art and deliver more compelling entertainment experiences for the travelers of tomorrow.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method is disclosed for peer-to-peer (P2P) networks for the delivery of media content accessible via the peer-to-peer network to a vehicle in a local subgroup of the P2P network. As used in the present disclosure, "vehicle" includes human conveyances of various types, for example automobiles, buses, rail cars, or watercraft, whether driven autonomously or by a person. As the vehicle travels along a route, it connects to and exchanges data with mobile mesh network servers based at least on proximity to the vehicle, quality of wireless connectivity between each prospective peer-to-peer network server and a receiver, for example a media player within the connected vehicle, or servers at places of interest along the route.

The method may include determining, by at least one processor, a local subgroup of P2P nodes at least in part by identifying users of the nodes sharing one or more targeted affinities. As used herein, an "affinity" is a consumer preference, whether expressed by the consumer or inferred from consumer behavior. In an alternative, or in addition, the at least one processor may perform the determining at least in part by optimizing serving of electronic media content to one or more nodes of the local subgroup. For example, the processor may calculate at periodic intervals or in response to events an optimal configuration of P2P nodes for meeting a defined information metric. In an aspect, and as used throughout the present disclosure, the P2P nodes may be, or include nodes of a mobile mesh network. In another aspect, the P2P nodes may be, or include high-bandwidth short-range (e.g., 5G) network nodes. A "node" may include a client device, for example, a personal computer, mobile phone, notepad computer, wearable devices, mixed reality device, virtual reality device, or augmented reality device. A node may also include a device that may operate as a server, for example, in a client-server environment. Therefore, "node" as used in the present disclosure may include either a client device, a server, or both. In an aspect, the node may be part of, or fixed to a vehicle, whether autonomously driven or driven by a human.

In an aspect, the method may determine a subgroup in response to a signal from a signaling device, for example, a client device, and based on at least one of: proximity of the signaling device or quality of wireless connectivity between each prospective node and a receiver coupled to the signaling device. In an example, a subgroup may include a group of mobile devices in the possession of a group of travelers traveling along a same route. In another example, a subgroup may include a group of mobile devices and one or more servers in proximity. The travelers may be in the same vehicle or in separate vehicles within proximity to one another. Organization and use of subgroups may enable high-bandwidth (e.g., 5G)

As described, the members of a subgroup may change in real-time, or dynamically.

The method may include collecting users of the nodes sharing one or more targeted affinities or optimizing serving of media content to one or more nodes of the local subgroup.

The method may further include selecting one or more packages of media content for delivery to at least one of the local subgroups. Media content may include audio video work, for example entertainment work, instructional, advertisement, gaming, social networking, and so on. In an aspect, the media content may be presented in an augmented, virtual or mixed reality (collectively referred to as xR) environment.

The method may further include providing the packages of media content held in one or more of the nodes to a player device in a vehicle shared by users of a subgroup as passengers for a transitory period. In an aspect, the node may be, or may include the player device. As described, a player device may include, for example, a personal computer, mobile phone, notepad computer, wearable devices, mixed reality device, virtual reality device, or augmented reality device. In another aspect, the player device may output a signal generated from the media content to an audio transducer or display screen integrated into the vehicle. The player device may output the signal during the transitory period. In an aspect, the outputting may include periods immediately before or after the transitory period.

In an aspect, the method may include creating an index of the packages of the media content available through the local subgroup. The method may further include selecting a program of the media content for play by the player device, based on the index and at least one of profile information for each of the passengers of the subgroup or trip information for the vehicle. Profile information may include for example: user affinities, vehicle physical location/city, travel context such as weather, rain or snow, general social trends, social trends applying to users of the local subgroup, demographic attributes of the users of the local subgroup, secure identity level, reputation score, membership status in a real or virtual group, or reward status in a systems of consumer rewards. User targeted affinities may further include one or more of shared interests in media content, similarity in demographic profile, a common destination, or prior social connections Trip information may include, for example, trip origin, destination and places that may or may not be of interest or planned, along the trip route, vehicle physical location/city, and travel context such as weather, rain or snow. User targeted affinities may further include one or more of shared interests in media content, similarity in demographic profile, a common destination, or prior social connections.

In an aspect, the method may cache a copy of the program in one of the network nodes for play during at least one of the transitory period or a subsequent period.

In another aspect, the method may determine the local subgroup based on optimizing serving of the media content to one or more nodes of the local subgroup without regard for user affinities.

In an aspect, the vehicle may transport one or more passengers of the subgroup, including while in stationary position, or while one or more passengers transiting in or out of the vehicle, or when one or more passengers are heading to the vehicle.

In an aspect, a program of the media content for play by the player device may be based on license terms indicated for qualified media content. Qualified media content means content which is qualified for play by the player device based on license terms granted to one or more end users or operators.

In an aspect, the method may include determining one or more mesh network nodes, or high-bandwidth short-range [5G] network nodes along a trip route of the vehicle for delivering the packages of media content, or at least a portion of the packages.

In another aspect of the disclosure, a computer-implemented method is disclosed for P2P networks for transferring of physical articles or electronic data package (may be referred to collectively as items) between vehicles traveling different routes. The method may include receiving a message requesting delivery of one of an identified physical article or electronic data package to an identified recipient vehicle. In an aspect, the requesting message may be received at a receiver coupled to a vehicle. For example, a receiver fixed to the vehicle, or a portable device present in the vehicle may receive the requesting message.

The method may further include determining an identity, a location, and a current route information of one or more vehicles containing the identified item or copy thereof. In an aspect, the method may determine the identity of the vehicles based on an inventory record for at least one of an identified physical article or electronic data package. In an aspect, the method may determine the identity of the vehicles based on RFID/IoT detection. In another aspect, the method may determine the identity of the vehicles based on a current state of a vending machine holding an identified physical article or electronic data package. In an example, the vending machine may be part of or located on the vehicles.

In an aspect, the method may further include selecting a delivery vehicle from one of the vehicles containing the identified item or copy thereof and directing the delivery vehicle and the recipient vehicle to a rendezvous for delivery of the physical article to the recipient vehicle. In an aspect, the method may further select the delivery vehicle based on geographical proximity, shortest route, fastest route, least expensive route, preferred route, or a combination thereof.

In an aspect, the method may select the rendezvous based on conditions for stopping two vehicles, for example the delivery and recipient vehicles, in close proximity. In an aspect, the method may select the rendezvous based on conditions for a close-range high-bandwidth data transfer between the recipient and delivery vehicles. In an aspect, the method may generate and confirm a message to a parking reservation server at the rendezvous (shared destination), requesting that adjacent parking spaces be reserved for the recipient and delivery vehicles. In an aspect, the method may select the rendezvous based on conditions for sending an airborne drone between the recipient and delivery vehicles.

In an aspect, the method may select the delivery vehicle based at least in part on minimizing at least one of: total delivery time, aggregate travel distance for the delivery and recipient vehicles, or aggregate travel time for the delivery and recipient vehicles. In an aspect, the method may select the delivery vehicle based on a table of weighted factors including at least total delivery time, aggregate travel distance for the delivery and recipient vehicles, and aggregate travel time for the delivery and recipient vehicles.

In another aspect, the method may select the delivery vehicle based on a predictive machine-learning algorithm trained to optimize one or more criteria. The criteria may be, for example, from a group consisting of: fastest delivery time, least aggregate travel distance for the delivery and recipient vehicles, and least aggregate travel time for the delivery and recipient vehicles.

In an aspect, the method may include for transferring of physical articles or electronic data package from a first vehicle to a second, then from a second vehicle to a third vehicle, and so on. In the example of electronic data packages, the transferring of the packages in this successive manner may be advantageous in a 5G network where the wireless signals may be limited in distance.

In an aspect, the methods of the present disclosure may further use distributed ledger, for example blockchain technology, for identification and authentication. For example, distributed ledger may be used in identifying members of a subgroups or delivery vehicle or used in payment transactions.

In another aspect, self-sovereign identity (SSI) may be used in conjunction with distributed ledger. SSI allows users to store information about their digital identity in a location of their choice. This information can then be provided to third parties on request, for example, using distributed ledger.

The methods described herein provide an automated process for peer-to-peer (P2P) networks for the delivery of media content held in the peer-to-peer network to a vehicle. In another aspect of the disclosure, methods described herein also provide an automated process for P2P networks for transferring of physical articles or electronic data package between vehicles traveling different routes. Applications for the methods may include, for example, dynamically generating and delivering of media content among a local subgroup of P2P nodes which may be devices in or fixed to vehicles travelling in a same trip. The media content may include, for example, enhanced games, entertainment, educational, tour application, advertisements, and so on. Users in the subgroup may also share media content, user profiles, receive rewards and discounts, and so on. Other applications may include, for example, delivering of articles among vehicles on the same or different routes. For example, a user passing a place of interest may request delivery of articles offered by that place and receives delivery from another vehicle, or from an airborne delivery device.

The foregoing method may be implemented in any suitable programmable computing apparatus, by provided program instructions in a non-transitory computer-readable medium that, when executed by a computer processor, cause the apparatus to perform the described operations. The processor may be local to the apparatus and user, located remotely, or may include a combination of local and remote processors. An apparatus may include a computer or set of connected computers that is used in audio video production or for output of audio video content to one or more users. An audio video output device may include, for example, a personal computer, mobile phone, notepad computer, mixed reality device, virtual reality device, or augmented reality device. Other elements of the apparatus may include, for example, an audio output device and a user input device, which participate in the execution of the method. An apparatus may include a virtual, augmented, or mixed reality device, such as a headset or other display that reacts to movements of a user's head and other body parts. The apparatus may include biometric sensors that provide data used by the method.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 6 is a flow chart illustrating an overview method of transferring of physical articles or electronic data package between vehicles traveling different routes.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
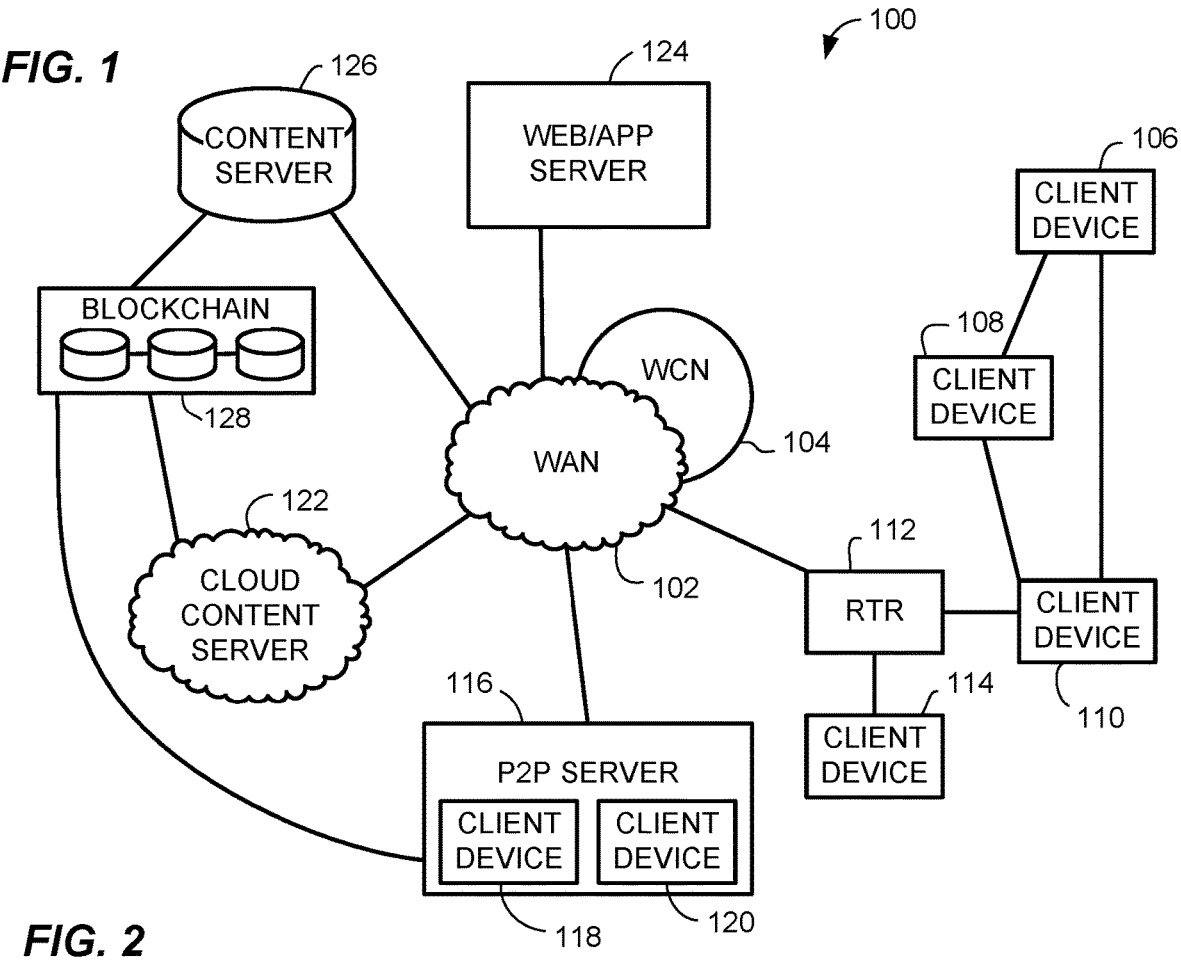
FIG. 1 is a schematic block diagram illustrating aspects of a system and apparatus for peer-to-peer (P2P) networks for the delivery of media content to a vehicle in a local subgroup, and for providing an automated process for transferring of physical articles or electronic data package between vehicles traveling different routes.

Referring to FIG. 1, methods for P2P networks for the delivery of media content held in the P2P network to a vehicle in a local subgroup of the P2P network, and for transferring of physical articles or electronic data package between vehicles traveling different routes may be implemented in a P2P network 100. Other architectures may also be suitable. In a network architecture, sensor data can be collected and processed locally, and used to control streaming data from a network source. In alternative aspects, audio video content may be controlled locally, and log data provided to a remote server. As used herein, "media content" refers to digital audio-video content that is arranged at least in part by a script designed to entertain or inform. The media content may also be configured to support interactive features resembling video game features or may be devoid of interactive features except for responding to data indicative of user's location, preferences, biometric states.

A suitable P2P network environment 100 may include various computer servers and other network entities in communication with one another and with one or more networks, for example a Wide Area Network (WAN) 102 (e.g., the Internet) and/or a wireless communication network (WCN) 104, for example a cellular telephone network. In some aspects, the P2P network environment may be or include a mesh network. The servers and other networks entities (collectively referred to as "nodes") connect directly, dynamically and non-hierarchically to as many other nodes as possible and cooperate with one another to efficiently route data from/to client devices. This lack of dependency on one node allows for every node to participate in the relay of information. Mesh networks dynamically self-organize and self-configure. The servers can connect to client devices in a server-client structure.

Computer servers may be implemented in various architectures. For example, the environment 100 may include one or more Web/application servers 124 containing documents and application code compatible with World Wide Web protocols, including but not limited to HTML, XML, PHP and Javascript documents or executable scripts, for example. The environment 100 may include one or more content servers 126 for holding data, for example video, audio-video, audio, and graphical content components of media content for consumption using a client device, software for execution on or in conjunction with client devices, and data collected from users or client devices. Data collected from client devices or users may include, for example, sensor data and application data. Sensor data may be collected by a background (not user-facing) application operating on the client device, and transmitted to a data sink, for example, a cloud-based content server 122 or discrete content server 126. Application data means application state data, including but not limited to records of user interactions with an application or other application inputs, outputs or internal states. Applications may include software for production or control of media content and supporting functions. Applications and data may be served from other types of servers, for example, any server accessing a distributed blockchain data structure 128, or a P2P server 116 such as may be provided by a set of client devices 118, 120 operating contemporaneously as micro-servers or clients.

As used herein, users may be viewers of media content. User may actively participate in interactive content via an avatar or other agency, or may be passive viewers. Viewers are not always users. For example, a bystander may be a passive viewer who does not interact with the content.

The network environment 100 may include various client devices in a mobile mesh network, for example a mobile smart phone client 106 and notepad client 108, or a portable computer client device 110, a mixed reality (e.g., virtual reality or augmented reality) client device 114 which may connect to servers via a router 112 (which may be optional) and the WAN 102. In a mobile mesh network, nodes (shown as client devices 106, 108, 100, 114) are usually small radio transmitters that function in the same way as a wireless router. Nodes use the common WiFi standards to communicate wirelessly with client devices, and, more importantly, with each other. Nodes are programmed with software that tells them how to interact within the larger network. Information travels across the network from point A to point B by hopping wirelessly from one mesh node to the next. The nodes automatically choose the quickest and safest path in a process known as dynamic routing. In a wireless mesh network, only one node needs to be physically wired to a network connection like an Internet modem. That one wired node then shares its Internet connection wirelessly with all other nodes in its vicinity. Those nodes then share the connection wirelessly with the nodes closest to them. The more nodes, the further the connection spreads, creating a wireless "cloud of connectivity". In general, client devices may be, or may include, computers or media players used by users to access media content provided via a server or from local storage.

Figure 2:
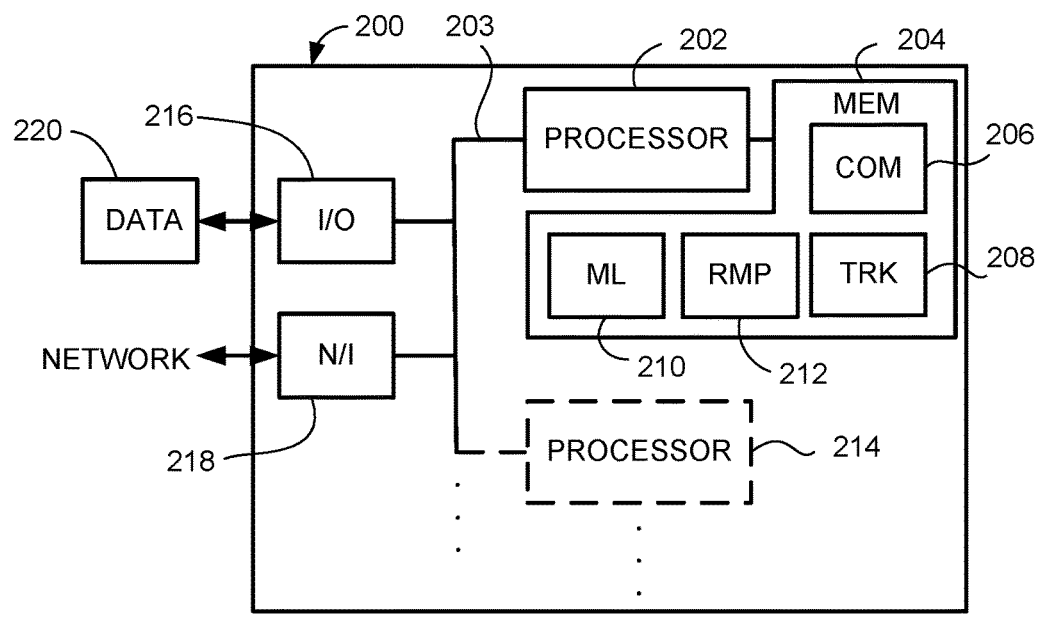
FIG. 2 is a schematic block diagram illustrating aspects of a server for producing audio video content.

FIG. 2 shows a media content server 200 for controlling output of digital media content, which may operate in the environment 100, in similar networks, or as an independent server. The server 200 may include one or more hardware processors 202, 214 (two of one or more shown). Hardware includes firmware. Each of the one or more processors 202, 214 may be coupled to an input/output port 216 (for example, a Universal Serial Bus port or other serial or parallel port) to a source 220 for sensor data indicative of users' biometric states and viewing history. Viewing history may include a log-level record of variances from a baseline script for a content package or equivalent record of control decisions made in response to user biometric states and other input. Viewing history may also include content viewed on TV, Netflix™ and other sources. The server 200 may track user actions and biometric responses across multiple content titles for individuals or cohorts. Some types of servers, e.g., cloud servers, server farms, or P2P servers, may include multiple instances of discrete servers 200 that cooperate to perform functions of a single server.

The server 200 may include a network interface 218 for sending and receiving applications and data, including but not limited to sensor and application data used for controlling media content. The content may be served from the server 200 to a client device or stored locally by the client device. If stored local to the client device, the client and server 200 may cooperate to handle sensor data and other user functions. In some aspects, the client may handle all content control functions and the server 200 may be used for tracking only or may not be used at all. In other aspects, the server 200 performs content control functions.

Each processor 202, 214 of the server 200 may be operatively coupled to at least one memory 204 holding functional modules 206, 208, 210, 212 of an application or applications for performing a method as described herein. The modules may include, for example, a communication module 206 for communicating with client devices and servers. The communication module 206 may include instructions that when executed by the processor 202 and/or 214 cause the server to communicate control data, content data, and sensor data with a client device via a network or other connection. A tracking module 208 may include functions for tracking emotional response and other interactive data for a user or cohort, for one or more content titles, subject to user permissions and privacy settings.

The modules may include, for example, a machine learning process (MLP) module 210. The MLP module 210 may include instructions that when executed by the processor 202 and/or 214 cause the server to perform one or more of applying a machine learning process or predictive algorithm encoded in a computer language to data indicative of user reactions thereby identifying a user's information useful for a content control algorithm. The machine learning process 210 when executed by the processor may cause the server to assign a likelihood of a targeted outcome for specific control actions.

The modules may further include a remote media player function 212 that when executed by the processor causes the server to perform any one or more of the functions described herein for a media player. In alternative aspects, the remote media player function may be omitted from the server memory 204 and provided in the memory of a client device. The memory 204 may contain additional instructions, for example an operating system, and supporting modules.

Figure 3:
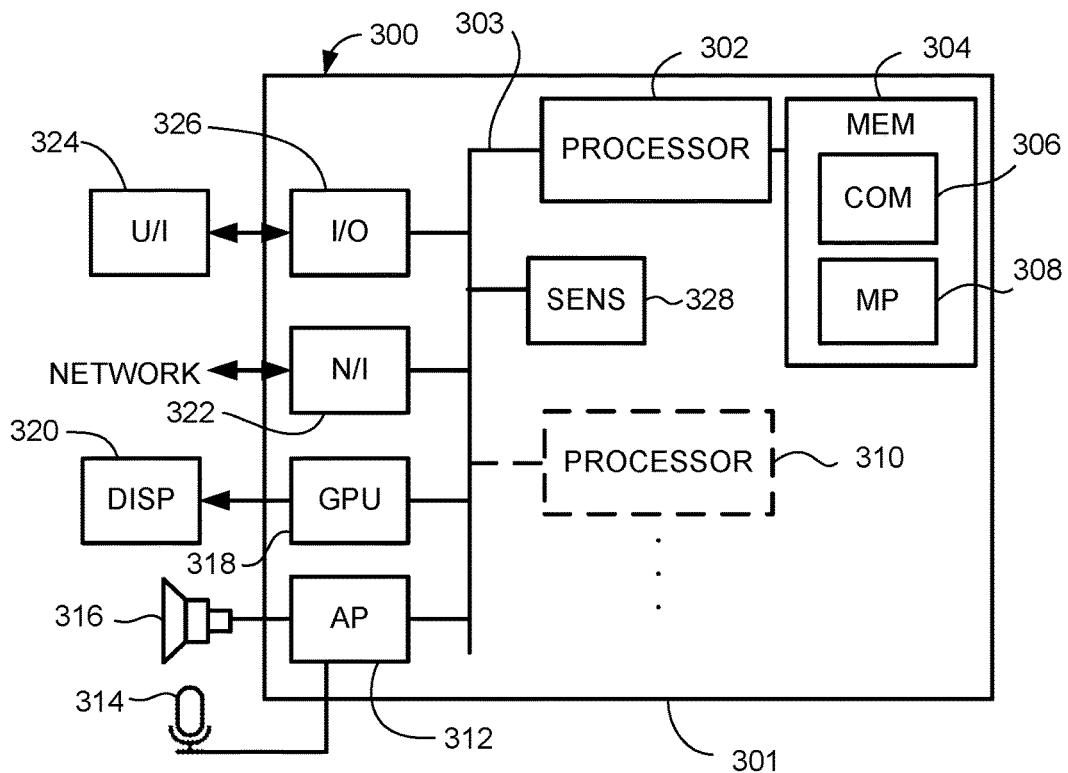
FIG. 3 is a schematic block diagram illustrating aspects of a client device for controlling output of audio video content.

Referring to FIG. 3, aspects of a content consumption device or client device 300 for controlling output of digital media content. The apparatus 300 may include, for example, a processor 302, for example a central processing unit, a system-on-a-chip, or any other suitable microprocessor. The processor 302 may be communicatively coupled to auxiliary devices or modules of the 3D environment apparatus 300, using a bus or other coupling. Optionally, the processor 302 and its coupled auxiliary devices or modules may be housed within or coupled to a housing 301, for example, a housing having a form factor of a television, set-top box, smartphone, wearable googles, glasses, or visor, or other form factor.

A user interface device 324 may be coupled to the processor 302 for providing user control input to a process for controlling output of digital media content. The process may include outputting video and audio for a conventional flat screen or projection display device. In some aspects, the media control process may be, or may include, audio-video output for an immersive mixed reality content display process operated by a mixed reality immersive display engine executing on the processor 302. In some aspects, the process may include haptic output.

In some aspects, for example when the user environment is a connected vehicle, the process may include projecting video content onto a screen covering a window of the vehicle, or displaying on a display device installed in place of a glass window, for example, a transparent LCD screen.

User control input may include, for example, selections from a graphical user interface or other input (e.g., textual or directional commands) generated via a touch screen, keyboard, pointing device (e.g., game controller), microphone, motion sensor, camera, or some combination of these or other input devices represented by block 324. Such user interface device 324 may be coupled to the processor 302 via an input/output port 326, for example, a Universal Serial Bus (USB) or equivalent port. Control input may also be provided via a sensor 328 coupled to the processor 302. A sensor may comprise, for example, a motion sensor (e.g., an accelerometer), a position sensor, a camera or camera array (e.g., stereoscopic array), a biometric temperature or pulse sensor, a touch (pressure) sensor, an altimeter, a location sensor (for example, a Global Positioning System (GPS) receiver and controller), a proximity sensor, a motion sensor, a smoke or vapor detector, a gyroscopic position sensor, a radio receiver, a multi-camera tracking sensor/controller, an eye-tracking sensor, a microphone or a microphone array. The sensor or sensors 328 may detect biometric data used as an indicator of the user's emotional state, for example, facial expression, skin temperature, pupil dilation, respiration rate, muscle tension, nervous system activity, or pulse. In addition, the sensor(s) 328 may detect a user's context, for example an identity position, size, orientation and movement of the user's physical environment and of objects in the environment, motion or other state of a user interface display, for example, motion of a virtual-reality headset.

Sensor data from the one or more sensors may be processed locally by the CPU 302 to control display output, and/or transmitted to a server 200 for processing by the server in real time, or for non-real-time processing. As used herein, "real time" refers to processing responsive to user input without any arbitrary delay between inputs and outputs; that is, that reacts as soon as technically feasible. "Non-real time" refers to batch processing or other use of sensor data that is not used to provide immediate control input for controlling the display, but that may control the display after some arbitrary amount of delay.

To enable communication with another node of a computer network, for example the media content server 200, the client 300 may include a network interface 322, wired or wireless. Network communication may be used, for example, to enable multiplayer experiences, including immersive or non-immersive experiences of media content. The system may also be used for other multi-user applications, for example social networking, group entertainment experiences, instructional environments, video gaming, and so forth. Network communication can also be used for data transfer between the client and other nodes of the network, for purposes including data processing, content delivery, content control, and tracking. The client may manage communications with other network nodes using a communications module 306 that handles application-level communication needs and lower-level communications protocols, preferably without requiring user management.

A display 320 may be coupled to the processor 302, for example via a graphics processing unit 318 integrated in the processor 302 or in a separate chip. The display 320 may include, for example, a flat screen color liquid crystal (LCD) display illuminated by light-emitting diodes (LEDs) or other lamps, a projector driven by an LCD display or by a digital light processing (DLP) unit, a laser projector, or other digital display device. The display device 320 may be incorporated into a virtual reality headset or other immersive display system. Video output driven by a mixed reality display engine operating on the processor 302, or other application for coordinating user inputs with an immersive content display and/or generating the display, may be provided to the display device 320 and output as a video display to the user. Similarly, an amplifier/speaker or other audio output transducer 316 may be coupled to the processor 302 via an audio processor 312. Audio output correlated to the video output and generated by the media player module 308, media content control engine or other application may be provided to the audio transducer 316 and output as audible sound to the user. The audio processor 312 may receive an analog audio signal from a microphone 314 and convert it to a digital signal for processing by the processor 302. The microphone can be used as a sensor for detection of biometric state and as a device for user input of sound commands, verbal commands, or for social verbal responses to NPC's or other users participating in an interactive, multi-user game or presentation.

The 3D environment apparatus 300 may further include a random-access memory (RAM) 304 holding program instructions and data for rapid execution or processing by the processor. When the device 300 is powered off or in an inactive state, program instructions and data may be stored in a long-term memory, for example, a non-volatile magnetic, optical, or electronic memory storage device (not shown). Either or both RAM 304 or the storage device may comprise a non-transitory computer-readable medium holding program instructions, that when executed by the processor 302, cause the device 300 to perform a method or operations as described herein. Program instructions may be written in any suitable high-level language, for example, C, C++, C#, JavaScript, PHP, or Java™, and compiled to produce machine-language code for execution by the processor.

Program instructions may be grouped into functional modules 306, 308, to facilitate coding efficiency and comprehensibility. The modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. The modules may be high-level modules only. The media player module 308 may perform operations of any method described herein, and equivalent methods, in whole or in part. Operations may be performed independently or in cooperation with another network node or nodes, for example, the server 200.

Figure 4:
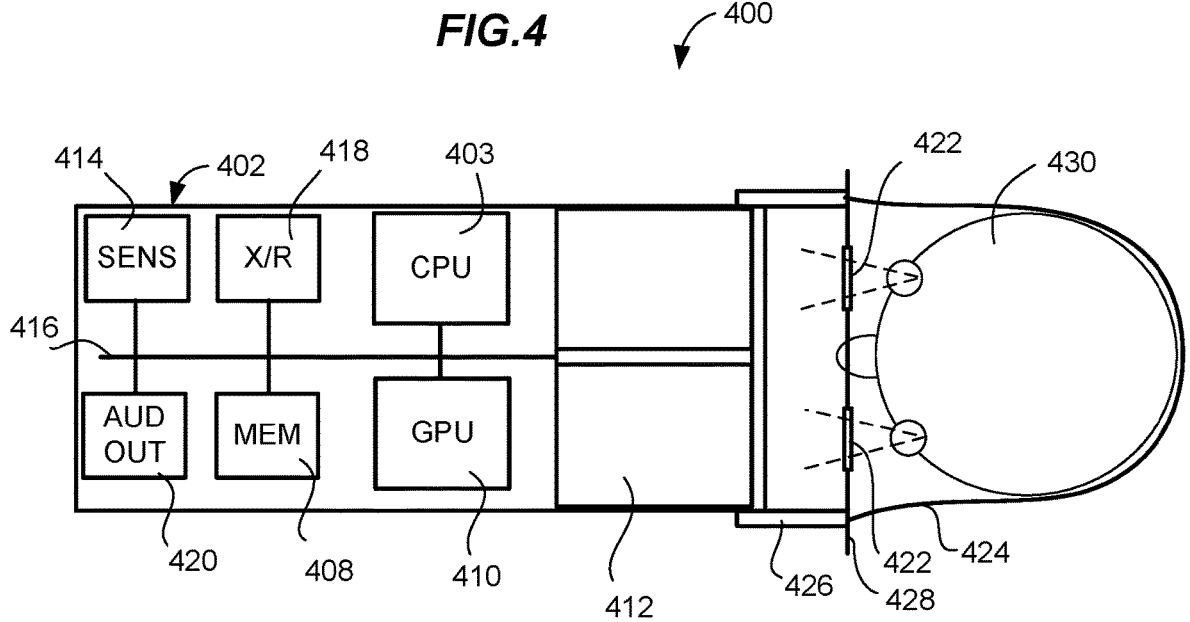
FIG. 4 is a schematic diagram showing features of a virtual-reality client device for controlling output of audio video content.

In addition to conventional 2D output or 3D output for display on two-dimensional (flat or curved) screens (e.g., by televisions, mobile screens, or projectors), the media content control methods disclosed herein may be used with virtual reality (VR), augmented reality (AR) or mixed reality output devices (collectively referred to herein as xR). FIG. 4 is a schematic diagram illustrating one type of immersive xR stereoscopic display device 400, as an example of the client 300 in a more specific form factor. The client device 300 may be provided in various form factors, of which device 400 provides but one example. The innovative methods, apparatus and systems described herein are not limited to a single form factor but may be used in any video output device suitable for cinematic output. As used herein, cinematic output includes any digital signal that produces audio-video output according to a script or narrative, which may be interactive. In an aspect, the cinematic content varies in response to a detected biometric state of the user.

The immersive xR stereoscopic display device 400 may include a tablet support structure made of an opaque lightweight structural material (e.g., a rigid polymer, aluminum or cardboard) configured for supporting and allowing for removable placement of a portable tablet computing or smartphone device including a high-resolution display screen, for example, an LCD display. The device 400 is designed to be worn close to the user's face, enabling a wide field of view using a small screen size such as in smartphone. The support structure 426 holds a pair of lenses 422 in relation to the display screen 412. The lenses may be configured to enable the user to comfortably focus on the display screen 412 which may be held approximately one to three inches from the user's eyes.

The device 400 may further include a viewing shroud (not shown) coupled to the support structure 426 and configured of a soft, flexible or other suitable opaque material for form fitting to the user's face and blocking outside light. The shroud may be configured to ensure that the only visible light source to the user is the display screen 412, enhancing the immersive effect of using the device 400. A screen divider may be used to separate the screen 412 into independently driven stereoscopic regions, each of which is visible only through a corresponding one of the lenses 422. Hence, the immersive VR stereoscopic display device 400 may be used to provide stereoscopic display output, providing a more realistic perception of 3D space for the user.

The immersive xR stereoscopic display device 400 may further comprise a bridge (not shown) for positioning over the user's nose, to facilitate accurate positioning of the lenses 422 with respect to the user's eyes. The device 400 may further comprise an elastic strap or band 424, or other headwear for fitting around the user's head and holding the device 400 to the user's head.

The immersive xR stereoscopic display device 400 may include additional electronic components of a display and communications unit 402 (e.g., a tablet computer or smartphone) in relation to a user's head 430. When wearing the support 426, the user views the display 412 though the pair of lenses 422. The display 412 may be driven by the Central Processing Unit (CPU) 403 and/or Graphics Processing Unit (GPU) 410 via an internal bus 417. Components of the display and communications unit 402 may further include, for example, a transmit/receive component or components 418, enabling wireless communication between the CPU and an external server via a wireless coupling. The transmit/receive component 418 may operate using any suitable high-bandwidth wireless technology or protocol, including, for example, cellular telephone technologies such as 3rd Generation Partnership Project (3GPP) Long Term Evolution (LTE), 5G fifth-generation cellular wireless, Global System for Mobile communications (GSM) or Universal Mobile Telecommunications System (UMTS), and/or a wireless local area network (WLAN) technology for example using a protocol such as Institute of Electrical and Electronics Engineers (IEEE) 802.11. The transmit/receive component or components 418 may enable streaming of video data to the display and communications unit 402 from a local or remote video server, and uplink transmission of sensor and other data to the local or remote video server for control or audience response techniques as described herein.

Components of the display and communications unit 402 may further include, for example, one or more sensors 414 coupled to the CPU 403 via the communications bus 417. Such sensors may include, for example, an accelerometer/inclinometer array providing orientation data for indicating an orientation of the display and communications unit 402. As the display and communications unit 402 is fixed to the user's head 430, this data may also be calibrated to indicate an orientation of the head 430. The one or more sensors 414 may further include, for example, a Global Positioning System (GPS) sensor indicating a geographic position of the user. The one or more sensors 414 may further include, for example, a camera or image sensor positioned to detect an orientation of one or more of the user's eyes, or to capture video images of the user's physical environment (for xR mixed reality), or both. In some aspects, a camera, image sensor, or other sensor configured to detect a user's eyes or eye movements may be mounted in the support structure 426 and coupled to the CPU 403 via the bus 416 and a serial bus port (not shown), for example, a Universal Serial Bus (USB) or other suitable communications port. The one or more sensors 414 may further include, for example, an interferometer positioned in the support structure 404 and configured to indicate a surface contour to the user's eyes. The one or more sensors 414 may further include, for example, a microphone, array or microphones, or other audio input transducer for detecting spoken user commands or verbal and non-verbal audible reactions to display output. The one or more sensors may include, for example, electrodes or microphone to sense heart rate, a temperature sensor configured for sensing skin or body temperature of the user, an image sensor coupled to an analysis module to detect facial expression or pupil dilation, a microphone to detect verbal and nonverbal utterances, or other biometric sensors for collecting biofeedback data including nervous system responses capable of indicating emotion via algorithmic processing.

Components of the display and communications unit 402 may further include, for example, an audio output transducer 420, for example a speaker or piezoelectric transducer in the display and communications unit 402 or audio output port for headphones or other audio output transducer mounted in headgear 424 or the like. The audio output device may provide surround sound, multichannel audio, so-called 'object-oriented audio', or other audio track output accompanying a stereoscopic immersive xR video display content. Components of the display and communications unit 402 may further include, for example, a memory device 408 coupled to the CPU 403 via a memory bus. The memory 408 may store, for example, program instructions that when executed by the processor cause the apparatus 400 to perform operations as described herein. The memory 408 may also store data, for example, audio-video data in a library or buffered during streaming from a network node.

Figure 5A:
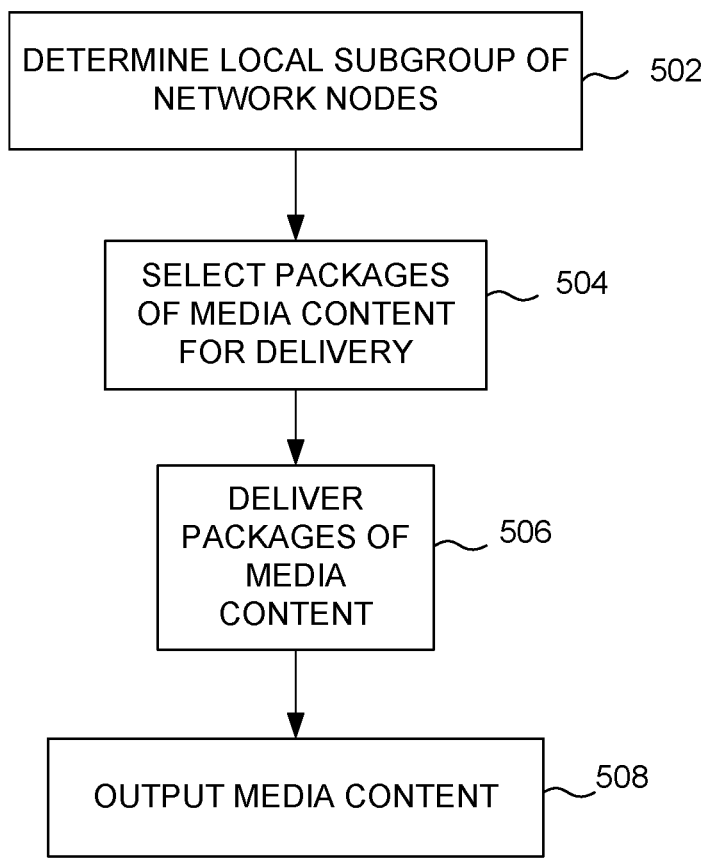
FIG. 5A is a flow chart illustrating an overview method of delivering media content to a vehicle in a local subgroup.

FIG. 5A shows an overview method 500 for the delivery of media content held in a P2P network to a vehicle in a local subgroup of the P2P network. The method 500 may be performed by one or more computer processors of a network node. At the process 502, a processor may determine a local subgroup of nodes. In an aspect, a subgroup may include a group of mobile devices in the possession of a group of travelers traveling along a same route. In another aspect, a subgroup may include a group of mobile devices and one or more servers in proximity. The travelers may be in the same vehicle or in separate vehicles within proximity to one another. The processor may change the membership of an initially determined subgroup at any useful time prior to beginning a trip, or during a trip as new members join and old members leave. For example, as mobile devices travel in and out or range with one another, the processor may alter subgroup membership to include new devices and exclude those who have left a region of interest.

For further example, the processor may adjust subgroup membership for fundamental route characteristics. Route selection exposes the traveler(s) to certain sites along the way ('Let's go by the windmills,' or 'Let's go by the harbor,' or . . . ) that may not only be desirable by the traveler(s) per se, but also may allow travelers to have certain nearby items delivered to them en route efficiently (e.g. 'Let's go by the cookie factory'). Thus, the processor may accept as input information about delivery of physical goods as a route characteristic that may affect subgroup membership, in addition to input regarding how certain routes in tandem with AR additions may support desirable content delivery ('Let's go by the Empire State Building' since we're both King Kong fans and he could be 'shown' at its apex via suitable AR means.) In either case, the processor may rearrange subgroup membership so that members with similar interests are grouped together.

At the process 504, a processor may select one or more packages of media content for delivery to the local subgroup. In an aspect, the processor may select the packages of media content based on profile information for each of the passengers of the subgroup or on trip information for one or more vehicles of the subgroup. In an aspect, the packages of media content may be held in one or more of the nodes of the P2P network.

At the process 506, a processor may deliver the packages of media content to a client device, for example a player device, in a vehicle shared by users of the subgroup as passengers for a transitory period. A player device may include, for example, a personal computer, mobile phone, notepad computer, wearable devices, mixed reality device, virtual reality device, or augmented reality device. In an aspect, the player device transmits the media content over a high-bandwidth, short-range wireless link, e.g., 5G. In an alternative, vehicles may receive high-bandwidth content on a physical media delivered by any convenient method of physical exchange, e.g., by drone delivery from one vehicle to another.

At the process 506, a client device may output a signal generated from the media content to an audio transducer or display screen integrated into the vehicle. The client device may output the signal during the transitory period. In an aspect, the outputting may include periods immediately before or after the transitory period.

Figure 5B:
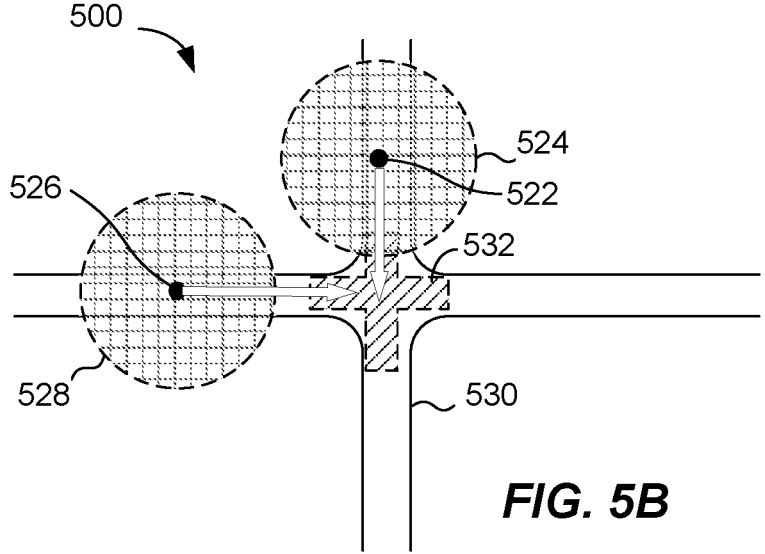
FIG. 5B is a concept diagram illustrating short-range overlap between vehicles traveling different routes

FIG. 5B shows a portion of a system 500 comprising vehicles 522 and 526 each traveling along an independently determined route over a system of streets 530. Each vehicle is characterized by a limited range 524, 528 of a wireless signal or physical delivery system (e.g., vehicle-to-vehicle drone). The nodes 522, 526 are traveling on a roadway grid 530 as indicated by their attached arrows. At the depicted point of time, the nodes are not in wireless communication range. Later, as the nodes progress, their ranges will overlap in a communication region 532 that represent a sum of points at which the two nodes 522, 526 are in wireless communication with each other during any period of their respective trips. For illustrative simplicity, the limited ranges 524, 528 are depicted as circles of constant 'R.' However, it should be appreciated that actual geometry for limited ranges may vary in space and time depending on field topography, antenna configuration and power, interfering structures, and similar factors. Nonetheless, given a function $F(p, R)$ wherein 'p' is vehicle position and 'R' is the range (which may be static or vary as a function of time), and knowing that 'p' is a function of time, planned route and road conditions, it is possible to algebraically compute a time-delimited envelope of range for each vehicle. From this, it is possible to compute an estimate of a time and duration that the vehicles 522, 526 will be in range of one another. A processor may from the time, duration and route information also compute a travel region 532 in which the vehicles are anticipated to be in range. In many use cases, time and duration of in-range presence may suffice. When more than two vehicles are involved, algebraic solutions may become undesirably complex, slow, or insolvable. More robust solution methods may include machine learning algorithms (e.g., deep neural nets) trained on sets of vehicle route inputs and in-range results. In-range results for neural network training may be obtained, for example, using transceivers in each vehicle coupled to a processor that records a time and place when two vehicles are in range.

The processor may determine geographic limits the region 532 by solving a system of equations for the condition $d<R$, wherein 'd' is the distance between the nodes and 'R' is the maximum distance at which the two nodes are in communication with each other. Both 'd' and 'R' can vary with time, with rates of change depending on factors such as traffic conditions, street geometry, the position of static transmitters in the network, the position and geometry of objects that that interfere with or block wireless transmission, and other sources of radio interference. The processor may account for such variables using system of differential equations, training a deep neural network or other machine learning algorithm to predict the region 532, or both. The communication region 532 reveals where two or more nodes will be in communication which each other. The processor may likewise determine which portions of the region 532 are active at different times. The system 500 exhibit a property in which 'R' is much less that he expect travel distance of one or more nodes in a subgroup.

Figure 5C:
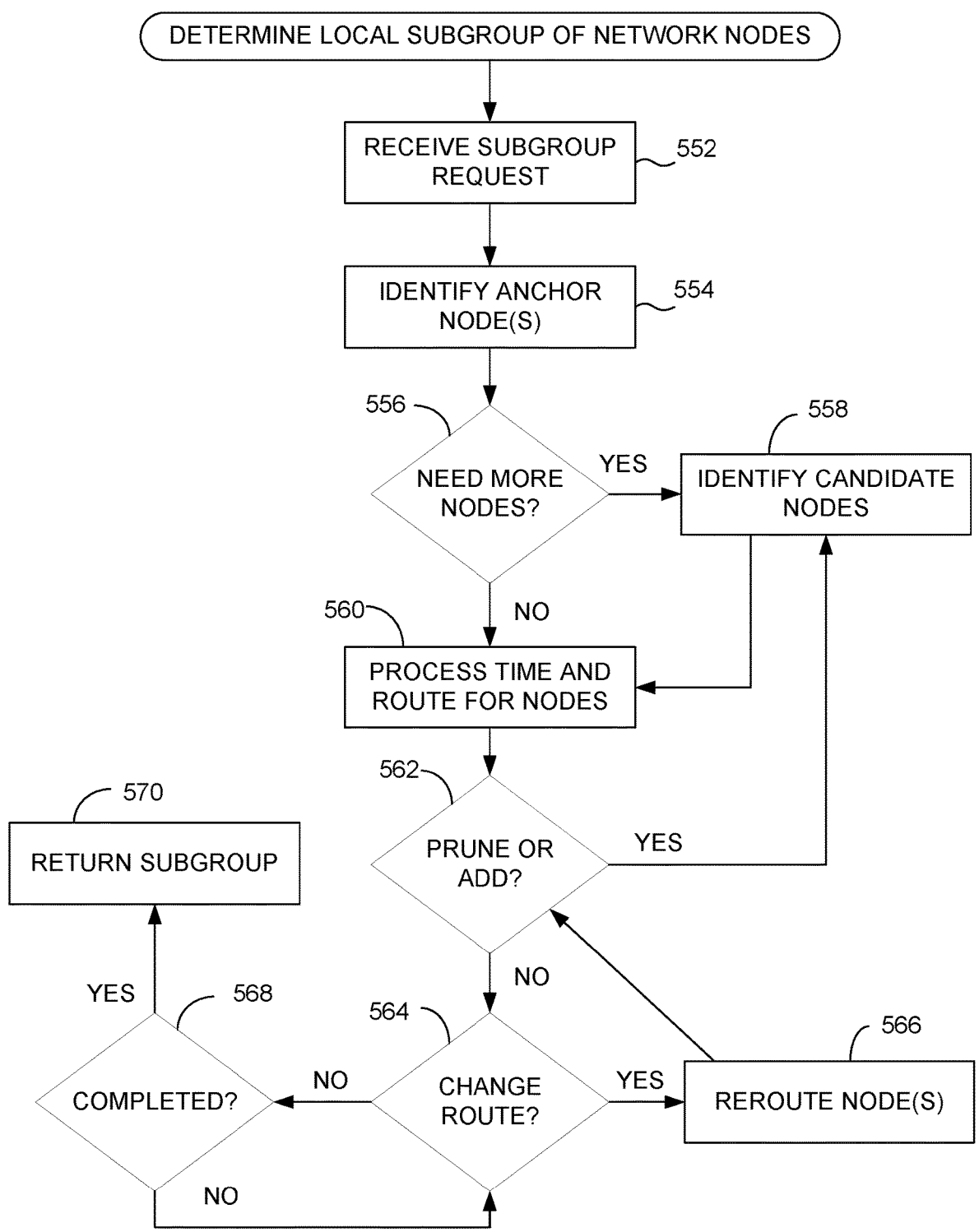
FIG. 5C is a flow chart illustrating determining a local subgroup of traveling nodes.

FIG. 5C shows a method or algorithm 550 for determining a local subgroup of traveling nodes in a network, wherein each of the nodes has a limited range compared to the anticipated travel distance. For example, along a travel route many tens or hundreds of kilometers long, the range of a high-bandwidth signal (e.g., 5G) or physical delivery mode (e.g., vehicle-to-vehicle drone) may be much less (e.g., <10%) of the range of travel. The method 550 may be used in these circumstances whether for wireless or physical delivery.

At 552, one or more processors of a network configuration server receives a service request from one or more vehicles of a network of traveling nodes. A service request may include, for example, a request to receive high-bandwidth content or a physical article via a network of moving nodes. The processor may interpret a request to receive anything by a limited range transmission involving traveling nodes as a request to join a subgroup consisting of at least the requesting node and a node that possesses, or can most efficiently obtain, the requested item—the "anchor node."

At 554, the at least one processor identifies one or more anchor nodes, depending on the item requested, the position and planned route of the requesting vehicle and the identity of one or more nodes that possesses or can most efficiently obtain the requested item. In addition, if more than one anchor node is available, the processor may rank the alternatives based on relative proximity, trip direction, time to transfer, or other factors and select the most optimal node.

At 556, the at least one processor may determine whether to add more nodes to the subgroup for delivery of the requested item. For example, the processor may determine whether the anchor node and the requesting node share a communication region within a desired delivery time window. If so, no additional nodes are needed. If not, at 558 the at least one processor may identify additional candidate nodes by searching for one or more linking nodes that satisfy the delivery window. For example, the processor may find and rank nodes that will be in an intervening geographic area between the anchor node and the requesting node during and before the delivery window, and rank combinations of such nodes by delivery time, safety, reliability, availability and/or other factors. The processor may pick the highest-ranking nodes for further processing.

At 560, the at least one processor may calculate a delivery time and routes for the nodes in the subset (requesting node, anchor node, and candidate nodes). At 562, the at least one processor may determine whether to add or remove ("prune") any of the candidate nodes, identifying additional candidate nodes at 558 if needed. If no nodes need to be removed or added, the at least one processor may at 564 determine whether any of the nodes needs to be rerouted for any reason, including but not limited to passenger requests or traffic conditions. At 566, the processor may reroute nodes or receive information regarding new routes in response to changing traffic conditions. Once the processor determines that no further changes are needed at 568, the process 550 returns the node identifiers of the subgroup, optionally with additional information such as instructions for transferring the requested item form the anchor node to the requesting node.

The methods of FIGS. 5B-C may also be used for physical delivery as a "physical mesh network." FIG. 6 shows an overview method 600 for transferring of physical articles or electronic data package between vehicles traveling different routes in a P2P network. The method 600 may be performed by one or more computer processors of a network node. At 602, a processor may receive a message requesting delivery of an identified physical article or an electronic data package to an identified recipient vehicle. In an aspect, a receiver fixed to a vehicle, or a portable device present in the vehicle may receive the requesting message.

At 604, a processor may determine an identity, a location, and a current route information of one or more vehicles containing the identified item or copy thereof. At 606, the processor may select subgroup of vehicles among these vehicles for delivery. In an aspect, the processor may further select the subgroup based on geographical proximity, shortest route, fastest route, least expensive route, preferred route, or a combination thereof. The processor may weigh and use these factors in addition to, or instead of, factors identified in connection with FIG. 5C above. The processor may use the method 550 to determine the subgroup.

At the process 608, a processor may direct the delivery of the identified item or copy thereof using the subgroup. For example, where the subgroup consists of the anchor node and the requesting node, the processor may direct the delivery vehicle and the recipient vehicle to a rendezvous for delivery of the identified item to the recipient vehicle. If the subgroup includes additional 'n' vehicles, the processor may direct transfer of the item from the anchor vehicle to the first (n=1) vehicle, from the first to the second, and so forth until the item is delivered to the requesting vehicle.

Figure 7:
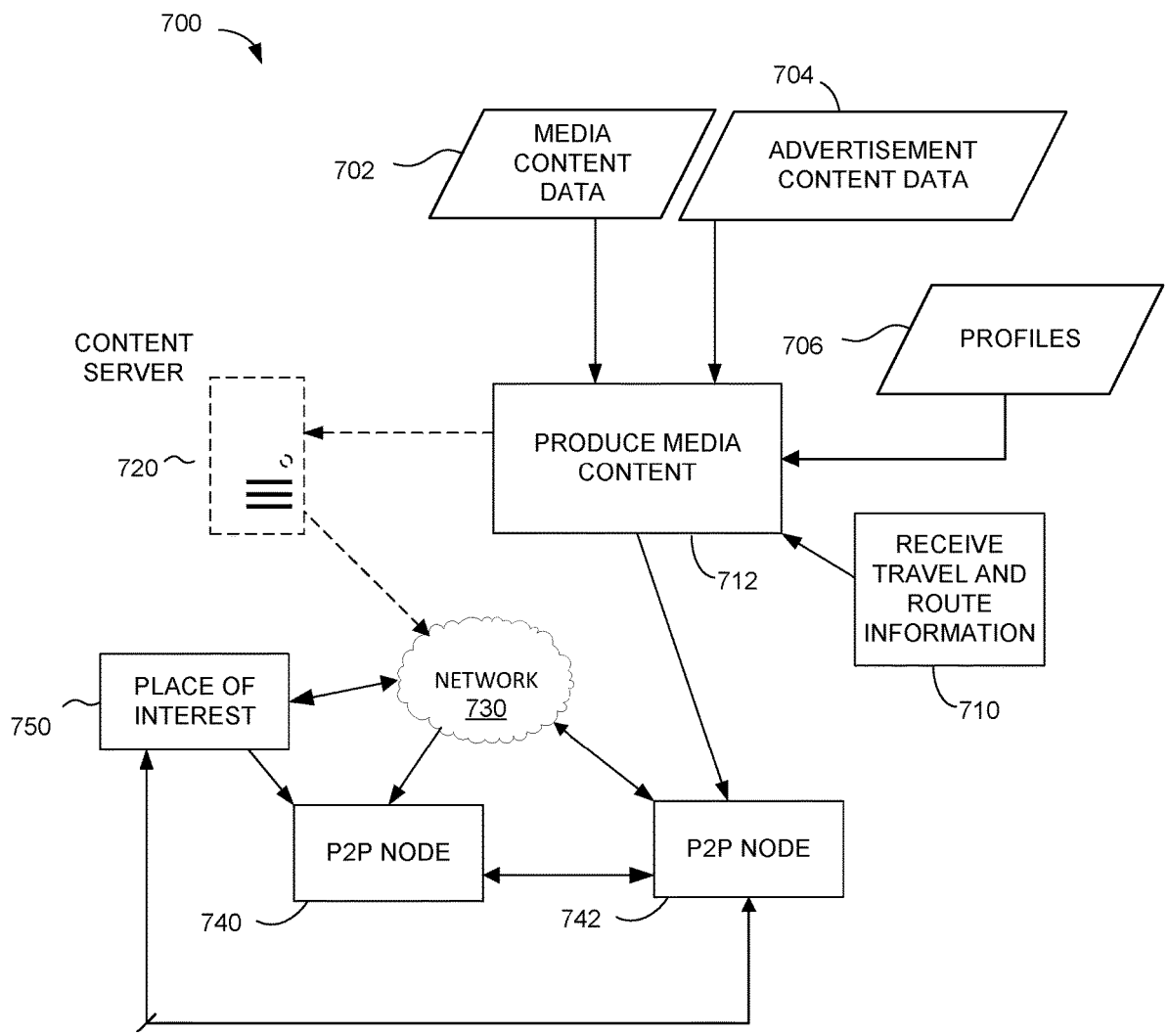
FIG. 7 is a block diagram illustrating an example of a computer network in which the novel methods and apparatus of the application may find use.

FIG. 7 shows a computer network 700 in which the novel methods and apparatus of the application may find use. In some aspects, one or more content servers 720 (e.g., a server farm or cloud) interconnected through a local area network, wide area network 730, or other network may execute the processes and algorithms described herein, producing digital media content that may be stored and distributed. In some other aspects, one or more P2P nodes may execute the processes and algorithms described herein, producing digital media content that may be stored and distributed. In some aspects, media content data 702 and advertisement content 704 may be in analog (e.g., film) and converted to digital form using any suitable conversion process, for example, digital scanning. A server or P2P node may produce media content with media content data 702 and ad content 704 based on profiles 706 and travel and route information 710. In some aspects, one or more content servers or P2P nodes may provide content for processing or delivery to servers at places (or points) of interest 750 along a route and to connected vehicles 740-742, through the network 730, e.g., the Internet or cellular telephone and data networks, and one or more router/modems/hotspots. The connected vehicles 740-742 and places of interest 750 may be connected via a mobile mesh network, for example as network nodes. In an aspect, the mobile mesh network may be an ad hoc network, selection of which may be as described in connection with FIG. 5C. Each connected vehicle 740-742 includes one or more media player for playing the media content. The media player may include, for example, smart phones, personal computers, notepad devices, projectors, and wearable xR devices. The media content may be transcoded to a suitable format for the player device prior to delivery.

Figure 8:
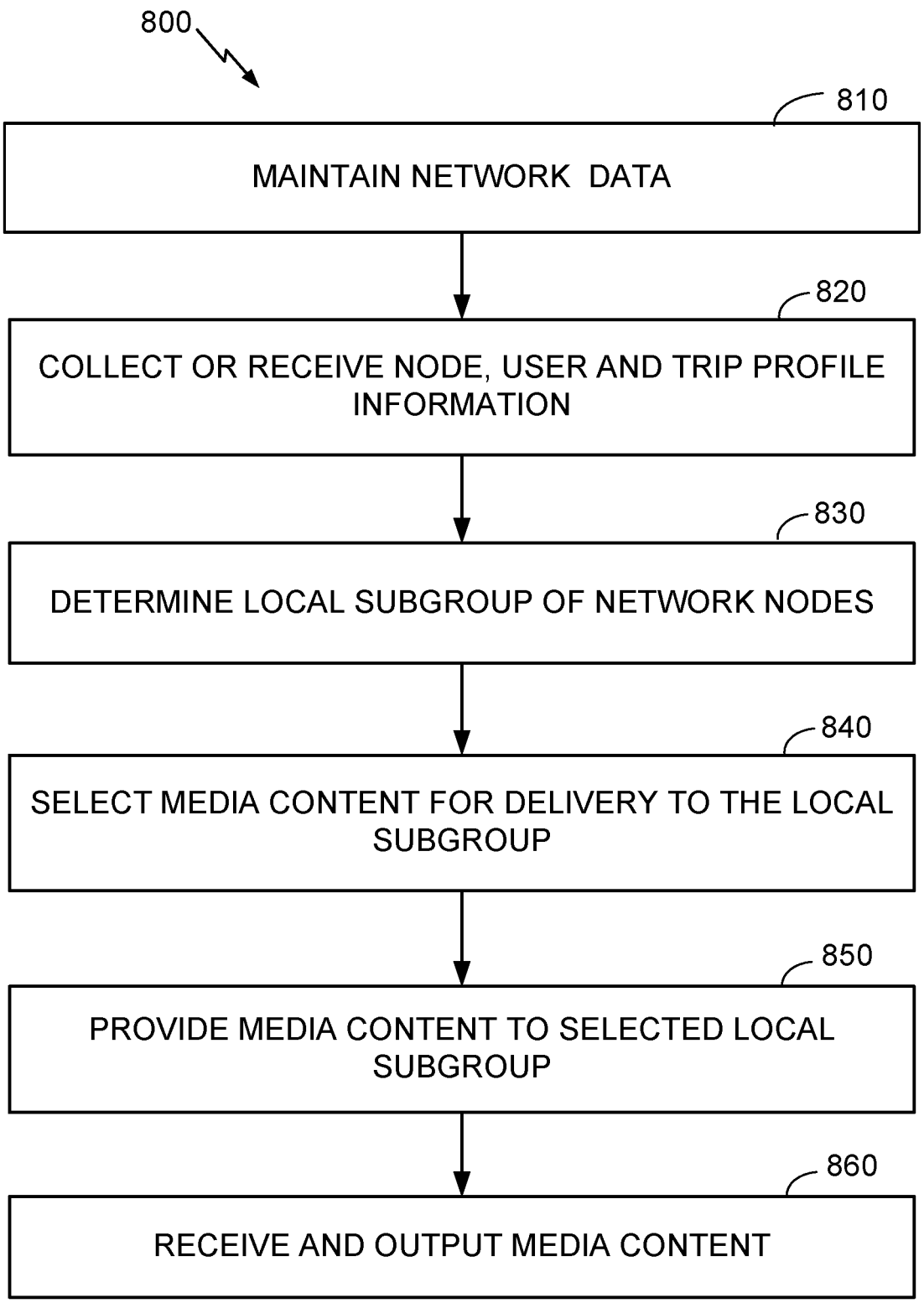
FIG. 8 is a flow diagram illustrating a process for producing and delivering media content to a vehicle in a local subgroup.

FIG. 8 diagrams a useful automatic process 800 for the delivery of media content held in a P2P network to a vehicle in a local subgroup of the P2P network. In an aspect of the present disclosure, the process 800 may be performed by one or more processors at a network node. At 810, a processor maintains data associated with nodes and servers in the network. The data may include node type, location, supported network protocols, attached devices, status and condition, etc. At 820, a processor collects or receives users, or user identifiers or identities, of the nodes sharing one or more targeted affinities. In an aspect, user data including user affinities may be stored in user profiles.

At 830, the processor determines a subgroup of transceiver nodes for optimizing the serving of electronic media content, in response to a signal from a signaling device, for example, a client device. In an aspect, the subgroup of users includes passengers in vehicles. The vehicle may transport one or more passengers of the subgroup, including while in stationary position, or while one or more passengers are transiting in or out of the vehicle, or when one or more passengers are heading to the vehicle. In an aspect, the processor may determine a subgroup based on one or more targeted user affinities. In another aspect, the processor may determine a subgroup based on at least one of: proximity of the signaling device or quality of wireless connectivity between each prospective node and a receiver coupled to the signaling device. In an example, a subgroup may include a group of mobile devices in the possession of a group of passengers traveling along a same route. In another example, a subgroup may include a group of mobile devices and one or more servers in proximity to the group of mobile devices. The passengers may be in the same vehicle or in separate vehicles within proximity to one another. The processor may perform the method 550 shown in FIG. 5C to select a subgroup of traveling P2P nodes optimal for transferring an article to the destination vehicle. As the subgroup may include nodes in proximity, it may also be referred to as a local subgroup.

As described, the members of a subgroup may change in real-time, or dynamically.

In an aspect, to optimize the serving of electronic media content or a portion thereof, the processor may dynamically determine one or more nodes in an ad hoc mesh network, or high-bandwidth short-range [5G] network along a trip route of the vehicle.

At 840, a processor selects one or more packages of media content for delivery to the subgroup. Media content may include audio video work, for example entertainment work, instructional, advertisement, gaming, social networking, and so on. In an aspect, the media content may be presented in an augmented, virtual or mixed reality (collectively referred to as xR) environment. In an aspect, the packages of media content may be held in one or more of the nodes. In an aspect, the node may be, or may include a player device. In an aspect, the processor selects a program of the media content based on license terms indicated for media content that by the license terms is qualified for play by the player device.

At 850, a processor provides the packages of media content to a player device in a vehicle shared by users of the subgroup as passengers for a transitory period. As described, a player device may include, for example, a personal computer, mobile phone, notepad computer, wearable devices, mixed reality device, virtual reality device, or augmented reality device.

In an aspect, the processor at 840 and 850 may be part of the player device.

At 860, the player device receives and outputs a signal generated from the media content to an audio transducer or display screen integrated into the vehicle. The player device may output the signal during the transitory period. In an aspect, the outputting may include periods immediately before or after the transitory period.

In an aspect, one or more processors of process 800 create an index of the packages of the media content available through the local subgroup. The processors may further select a program of the media content for play by the player device, based on the index and at least one of profile information for each of the passengers of the subgroup or trip information for the vehicle. Profile information may include for example: user affinities, vehicle physical location/city, travel context such as weather, rain or snow, general social trends, social trends applying to users of the local subgroup, demographic attributes of the users of the local subgroup, secure identity level, reputation score, membership status in a real or virtual group, or reward status in a systems of consumer rewards. User affinities may further include one or more of shared interests in media content, similarity in demographic profile, a common destination, or prior social connections User targeted affinities may further include one or more of shared interests in media content, similarity in demographic profile, a common destination, or prior social connections. Trip information may include, for example trip origin, destination and places that may or may not be of interest or planned, along the trip route, vehicle physical location/city, and travel context such as weather, rain or snow.

In another aspect, the processors may determine the local subgroup based on optimizing the serving of the media content to one or more nodes of the local subgroup without regard for user affinities.

Figure 9:
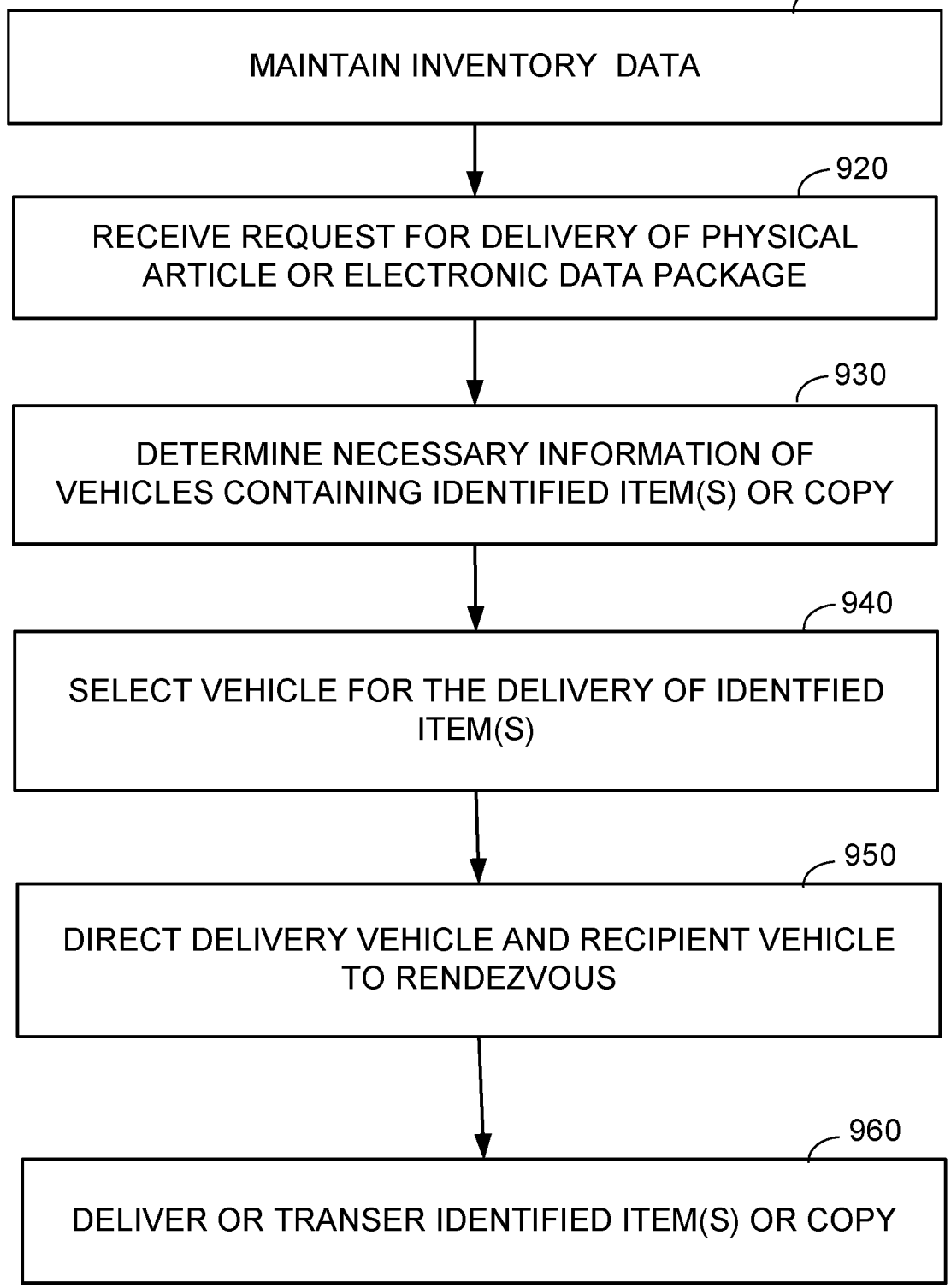
FIG. 9 is a flow diagram illustrating a process for transferring of physical articles or electronic data package between vehicles traveling different routes.

FIG. 9 diagrams a useful automatic process 900 for transferring of physical articles or electronic data package between vehicles traveling different routes in a P2P network. In an aspect of the present disclosure, the process 900 may be performed by one or more processors at a network node. At 910, a processor maintains inventory data of physical articles and electronic data packages (collectively referred to as items) that may be provided to passengers in one or more vehicles in the network. The items may be for purchase, lease, or rent. The processor may maintain inventory data in a database. The database may be local to the processor, cloud-based, or distributed among the nodes of the network. The inventory data may be dynamic and may use distributed ledger technology, for example blockchain technology.

At 920 a processor receives a message requesting delivery of one of an identified physical article or electronic data package to an identified recipient vehicle. In an aspect, the requesting message may be received via a receiver coupled to a vehicle. For example, a receiver fixed to the vehicle, or a portable device present in the vehicle may receive the requesting message. In an aspect, the requesting message may be a series of bits of a predetermined length. The processor retrieves the bits and converts them to a predetermined alphanumeric string representing a request.

At 930, a processor determines identity, location, and current route information of one or more vehicles containing the identified item or copy thereof. In an aspect, the processor may determine the identity of the vehicles based on an inventory record for at least one of an identified physical article or electronic data package. In an aspect, the processor may determine the identity of the vehicles based on RFID/IoT detection. In another aspect, the processor may determine the identity of the vehicles based on a current state of a vending machine holding the identified physical article or electronic data package. In an example, the vending machine may be part of or located in or on one or more of the vehicles.

At 940, a processor selects a delivery vehicle from one of the vehicles containing the identified item or copy thereof. In an aspect, the processor may further select the delivery vehicle or vehicles based on geographical proximity, shortest route, fastest route, least expensive route, preferred route, or a combination thereof. For example, the processor may use the method 550 shown in FIG. 5C. In an aspect, the processor may further confirm with the selected vehicle as to its readiness and availability, for example about its physical and mechanical conditions, driver status, and so on. In an aspect, the confirmation may be delivered from one or more sensors at the vehicle.

At 950, the processor directs each delivery vehicle and its corresponding recipient vehicle to a rendezvous for delivery of the physical article to the recipient vehicle. In an aspect, the processor may select the rendezvous based on conditions for stopping two vehicles, for example the delivery and recipient vehicles, in proximity to one another. In an aspect, the processor may select the rendezvous based on conditions for a close-range high-bandwidth data transfer between the recipient and delivery vehicles. In an aspect, the processor may generate and confirm a message to a parking reservation server at the rendezvous (or shared destination), requesting that adjacent parking spaces be reserved for the recipient and delivery vehicles. In an aspect, the processor may select the rendezvous based on conditions for sending an airborne drone between the recipient and delivery vehicles.

In an aspect, the processor may select the delivery vehicle or vehicles based at least in part on minimizing at least one of: total delivery time, aggregate travel distance for the delivery and recipient vehicles, or aggregate travel time for the delivery and recipient vehicles, or as described in connection with FIG. 5C. In an aspect, the processor may select the delivery vehicle based on a table of weighted factors including at least total delivery time, aggregate travel distance for the delivery and recipient vehicles, and aggregate travel time for the delivery and recipient vehicles.

In another aspect, the processor may select the delivery vehicle based on a predictive machine-learning algorithm trained to optimize one or more criteria. The criteria may be, for example, from a group consisting of: fastest delivery time, least aggregate travel distance for the delivery and recipient vehicles, and least aggregate travel time for the delivery and recipient vehicles.

At 960, a processor transfers the physical article(s) or electronic data package from the delivery vehicle to the recipient vehicle. In an aspect, multiple processors transfer the physical article(s) or electronic data package from a first delivery vehicle to a first recipient vehicle, then from the first recipient vehicle to a third recipient vehicle, and so on until a processor in the final recipient vehicle receives the physical article(s) or electronic data package. In the example of electronic data packages, the transferring of the packages in this successive manner may be advantageous in a 5G network where the wireless signals may be limited in distance.

In an aspect, the processors of the present disclosure may further use distributed ledger, for example blockchain technology, for identification and authentication. For example, distributed ledger may be used in identifying members of a subgroups, or delivery vehicle, or used in payment transactions.

In another aspect, self-sovereign identity (SSI) may be used in conjunction with distributed ledger. SSI allows users to store information about their digital identity in a location of their choice. This information can then be provided to third parties on request, for example, using distributed ledger.

Figure 10:
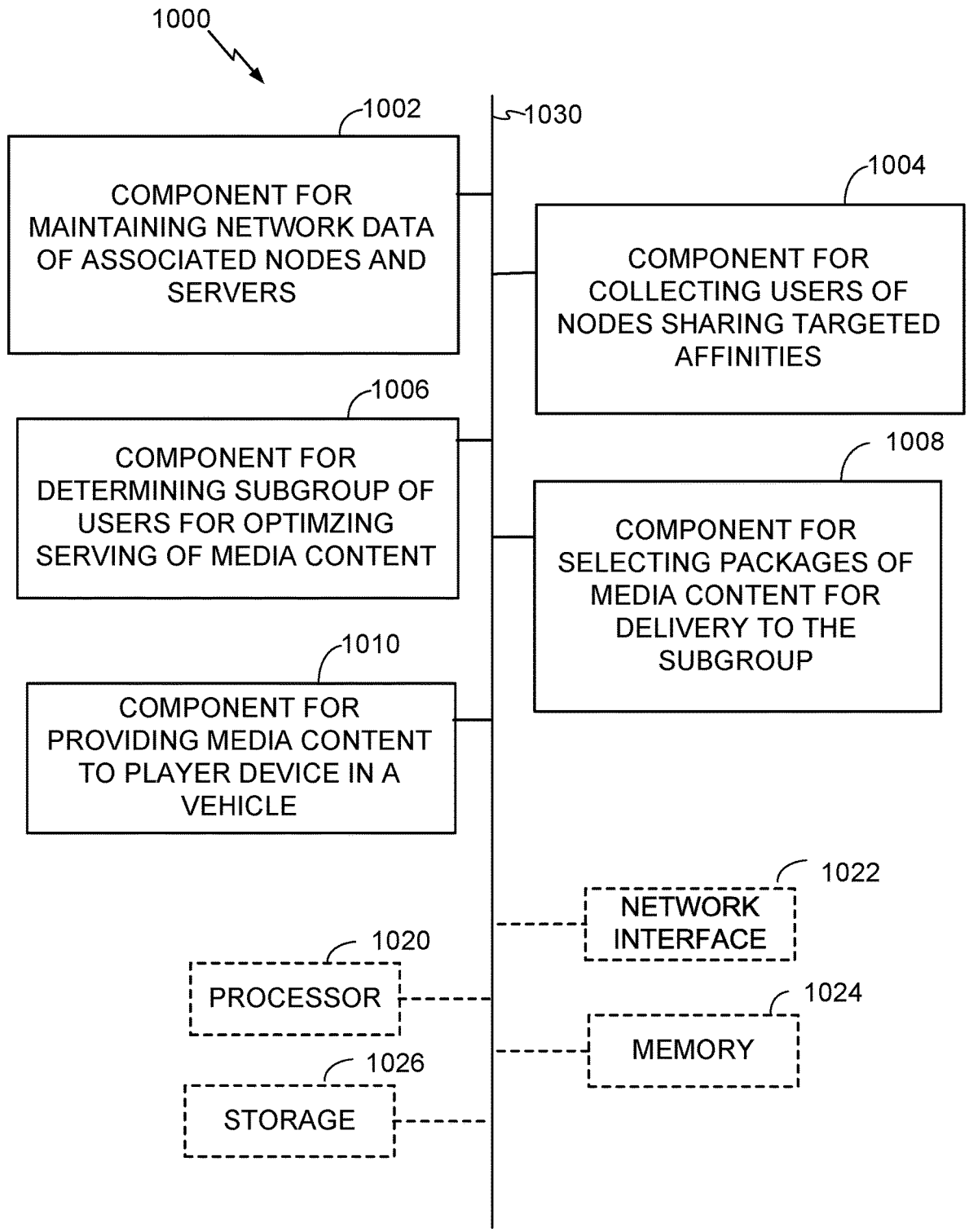
FIG. 10 is a conceptual block diagram illustrating components of an apparatus or system for the method as shown in FIG. 8.

FIG. 10 is a conceptual block diagram illustrating components of an apparatus or system 1000 for the delivery of media content held in a P2P network to a vehicle in a local subgroup of the P2P network as described herein, according to one embodiment. As depicted, the apparatus or system 1000 may include functional blocks that can represent functions implemented by a processor, software, or combination thereof (e.g., firmware).

As illustrated in FIG. 10, the apparatus or system 1000 may comprise an electrical component 1002 for maintaining, for example in a database, data associated nodes and servers. The data may include node type, location, supported network protocols, attached devices, status and condition, etc. The component 1002 may be, or may include, a means for said maintaining. Said means may include the processor 1020 coupled to the memory 1024, storage 1026 which may store the database, and to the network interface 1022, the processor executing an algorithm based on program instructions stored in the memory. Such algorithm may include a sequence of more detailed operations, for example, as described in connection with block 810 of FIG. 8 above.

The apparatus or system 1000 may further comprise an electrical component 1004 for collecting users, or user identifiers or identities, of the nodes sharing one or more targeted affinities. In an aspect, user data including user affinities may be collected into user profiles. The component 1004 may be, or may include, a means for said collecting. Said means may include the processor 1020 coupled to the memory 1024, storage 1026, and to the network interface 1022, the processor executing an algorithm based on program instructions stored in the memory. Such algorithm may include a sequence of more detailed operations, for example, maintaining a database of user identities, tracking user preferences expressed by one or more of online content consumption, travel patterns, expressed preferences or other activities using the database, and matching content to users based on one or more affinities in the database.

The apparatus or system 1000 may further comprise an electrical component 1006 for determining a subgroup of users for optimizing the serving of electronic media content, in response to a signal from a signaling device, for example, a client device. The component 1006 may be, or may include, a means for said determining. Said means may include the processor 1020 coupled to the memory 1024, storage 1026, and to the network interface 1022, the processor executing an algorithm based on program instructions stored in the memory. In an aspect, the information may be received from external systems via the network interface 1022. Such algorithm may include a sequence of more detailed operations, for example, as described in connection with FIG. 5C above for selection of deliver subgroup.

The apparatus or system 1000 may further comprise an electrical component 1008 for selecting one or more packages of media content for delivery to the subgroup. The component 1008 may be, or may include, a means for said selecting. Said means may include the processor 1020 coupled to the memory 1024, storage 1026, and to the network interface 1022, the processor executing an algorithm based on program instructions stored in the memory. Such algorithm may include a sequence of more detailed operations, for example, ranking available content titles in respect to affinities of users in the destination vehicle and choosing a higher-ranked title. In an alternative, the algorithm may use a deep neural network or other machine learning approach to predict content likely to appeal to one or more users characterized by known affinities.

The apparatus or system 1000 may further comprise an electrical component 1010 for providing the packages of media content to a player device in a vehicle shared by users of the subgroup as passengers for a transitory period. The component 1010 may be, or may include, a means for said providing. Said means may include the processor 1020 coupled to the memory 1024, storage 1026, and to the network interface 1022, the processor executing an algorithm based on program instructions stored in the memory. Such algorithm may include a sequence of more detailed operations, for example, generating instructions for transferring the content to each next vehicle in a subgroup, providing the instructions to each delivery vehicle in turn, and tracking progress of the media content.

As shown, the apparatus or system 1000 may include a processor component 1020 having one or more processors, which may include a digital signal processor. The processor 1020, in such case, may be in operative communication with the modules 1002-1010 via a bus 1030 or other communication coupling, for example, a network. The processor 1020 may initiate and schedule the functions performed by electrical components 1002-1010.

In related aspects, the apparatus or system 1000 may include a network interface module 1022 operable for communicating with any external storage device, with external systems or servers, or connected vehicles over a computer network. In further related aspects, the apparatus or system 1000 may optionally include a module for storing information, such as, for example, a memory device/module 1024. The computer readable medium or the memory module 1024 may be operatively coupled to the other components of the apparatus 1000 via the bus 1030 or the like. The memory module 1024 may be adapted to store computer readable instructions and data for effecting the processes and behavior of the modules 1002-1010, and subcomponents thereof, or the processor 1020, or one or more steps of the method 800. The memory module 1024 may retain instructions for executing functions associated with the modules 1002-1010. While shown as being external to the memory 1024, it is to be understood that the modules 1002-1010 can exist within the memory 1024.

Figure 11:
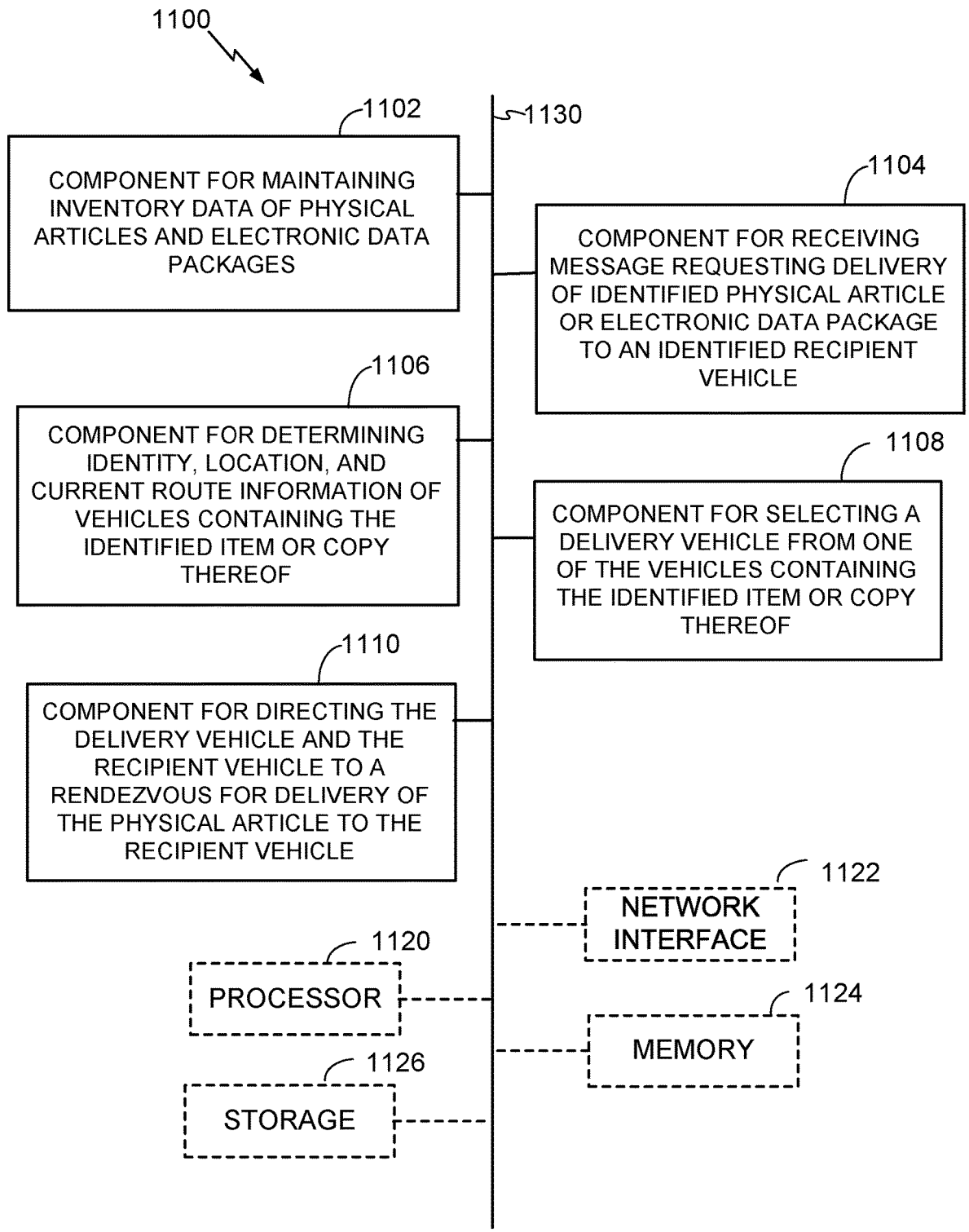
FIG. 11 is a conceptual block diagram illustrating components of an apparatus or system for the method as shown in FIG. 9.

FIG. 11 is a conceptual block diagram illustrating components of an apparatus or system 1100 for transferring of physical articles or electronic data packages between vehicles traveling different routes in a P2P network as described herein, according to one embodiment. As depicted, the apparatus or system 1100 may include functional blocks that can represent functions implemented by a processor, software, or combination thereof (e.g., firmware).

As illustrated in FIG. 11, the apparatus or system 1100 may comprise an electrical component 1102 for maintaining, for example in a database, inventory data of physical articles and electronic data packages that may be provided to passengers in one or more vehicles in the network. The component 1102 may be, or may include, a means for said maintaining. Said means may include the processor 1120 coupled to the memory 1124, storage 1126 which may store the database, and to the network interface 1122, the processor executing an algorithm based on program instructions stored in the memory. Such algorithm may include a sequence of more detailed operations, for example, maintaining a database of product identifiers with descriptive data for each item including its storage location, and updating the database as items are added and withdrawn from inventory of each node.

The apparatus or system 1100 may further comprise an electrical component 1104 for receiving a message requesting delivery of one of an identified physical article or electronic data package to an identified recipient vehicle. In an aspect, the requesting message may be received via a receiver coupled to a vehicle. The component 1104 may be, or may include, a means for said receiving. Said means may include the processor 1120 coupled to the memory 1124, storage 1126, and to the network interface 1122, the processor executing an algorithm based on program instructions stored in the memory. Such algorithm may include a sequence of more detailed operations, for example, receiving a message, identifying a request in the message, characterizing the request, and determining a source of the request.

The apparatus or system 1100 may further comprise an electrical component 1106 for determining identity, location, and current route information of one or more vehicles containing the identified item or copy thereof. The component 1106 may be, or may include, a means for said determining. Said means may include the processor 1120 coupled to the memory 1124, storage 1126, and to the network interface 1122, the processor executing an algorithm based on program instructions stored in the memory. In an aspect, the information may be received from external systems via the network interface 1122. Such algorithm may include a sequence of more detailed operations, for example, determining one or more source (anchor) nodes that include the item in their inventory, and querying each anchor node to obtain its current location, planned route, and available inventory.

The apparatus or system 1100 may further comprise an electrical component 1108 for selecting a delivery vehicle from one of the vehicles containing the identified item or copy thereof. The component 1108 may be, or may include, a means for said selecting. Said means may include the processor 1120 coupled to the memory 1124, storage 1126, and to the network interface 1122, the processor executing an algorithm based on program instructions stored in the memory. Such algorithm may include a sequence of more detailed operations, for example, as described in connection with FIG. 5C above.

The apparatus or system 1100 may further comprise an electrical component 1110 for directing the delivery vehicle and the recipient vehicle to a rendezvous for delivery of the physical article to the recipient vehicle. The component 1110 may be, or may include, a means for said directing. Said means may include the processor 1120 coupled to the memory 1124, storage 1126, and to the network interface 1122, the processor executing an algorithm based on program instructions stored in the memory. Such algorithm may include a sequence of more detailed operations, for example, where the subgroup consists of the anchor node and the requesting node, the processor may direct the delivery vehicle and the recipient vehicle to a rendezvous for delivery of the identified item to the recipient vehicle. If the subgroup includes additional 'n' vehicles, the processor may direct transfer of the item from the anchor vehicle to the first (n=1)

vehicle, from the first to the second, and so forth until the item is delivered to the requesting vehicle.

As shown, the apparatus or system 1100 may include a processor component 1120 having one or more processors, which may include a digital signal processor. The processor 1120, in such case, may be in operative communication with the modules 1102-1110 via a bus 1130 or other communication coupling, for example, a network. The processor 1120 may initiate and schedule the functions performed by electrical components 1102-1110.

In related aspects, the apparatus or system 1100 may include a network interface module 1122 operable for communicating with any external storage device, with external systems or servers, or connected vehicles over a computer network. In further related aspects, the apparatus or system 1100 may optionally include a module for storing information, such as, for example, a memory device/module 1124. The computer readable medium or the memory module 1124 may be operatively coupled to the other components of the apparatus 1100 via the bus 1130 or the like. The memory module 1124 may be adapted to store computer readable instructions and data for effecting the processes and behavior of the modules 1102-1110, and subcomponents thereof, or the processor 1120, or one or more steps of the method 800. The memory module 1124 may retain instructions for executing functions associated with the modules 1102-1110. While shown as being external to the memory 1124, it is to be understood that the modules 1102-1110 can exist within the memory 1124.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

In the foregoing description and in the figures, like elements are identified with like reference numerals. The use of "e.g.," "etc.," and "or" indicates non-exclusive alternatives without limitation, unless otherwise noted. The use of "including" or "include" means "including, but not limited to," or "include, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

In many instances, entities are described herein as being coupled to other entities. The terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together or described as coupled together without description of any intervening entity, those entities can be indirectly coupled together as well unless the context clearly dictates otherwise. The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), televisions, digital projectors, smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device (PLD) or complex PLD (CPLD), discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-Ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-Ray™ or other format), smart cards, and flash memory devices (e.g., card, stick, or other format). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method for a peer-to-peer network, the method comprising:
   determining, by one or more processors, a local subgroup of one or more network nodes by identifying users of the one or more network nodes sharing one or more targeted affinities;
   selecting, by the one or more processors, one or more packages of electronic media content for delivery to at least one of the network nodes of the local subgroup based on profile information for each of the identified users or based on trip information stored for at least one local subgroup profile; and
   transmitting, by the one or more processors, the one or more packages of electronic media content held in one or more of the network nodes to a player device associated with one of the users of at least one of the network nodes of the local subgroup for a transitory period.

2. The computer-implemented method of claim 1, wherein the one or more processors determine the local subgroup in response to a signal from a signaling device, the signal being based on at least one of: proximity of the local subgroup to the signaling device or a quality of wireless connectivity between each prospective network node and the signaling device.

3. The computer-implemented method of claim 1, wherein the player device is at least one of the network nodes.

4. The computer-implemented method of claim 1, further comprising:
   preparing, by the one or more processors, an index of the packages of the electronic media content available through the local subgroup.

5. The computer-implemented method of claim 4, further comprising:
   selecting, by the one or more processors, a program of the electronic media content for play by the player device, based on the index and at least one of profile information or trip information for the network node.

6. The computer-implemented method of claim 5, further comprising:
   caching, by the one or more processors, a copy of the program in one or more of the network nodes for play during at least one of the transitory period or a subsequent period.

7. The computer-implemented method of claim 5, wherein the profile information characterizes one or more of: a vehicle physical location/city, a travel context including weather, general social trends, social trends applying to users of the local subgroup, demographic attributes of the users of the local subgroup, secure identity level, reputation score, membership status in a real or virtual group, or reward status in a systems of consumer rewards.

8. The computer-implemented method of claim 4, further comprising:
   selecting, by the one or more processors, a program of the electronic media content for play by the player device based on license terms indicated for qualified media content.

9. The computer-implemented method of claim 1, further comprising:
   determining, by the one or more processors, one or more high-bandwidth short-range network nodes along a real-time location of the network node for delivering the one or more packages of electronic media content.

10. The computer-implemented method of claim 9, further comprising:
    delivering, by the one or more processors, at least a portion of the one or more packages of electronic media content via the one or more high-bandwidth short-range network nodes to one or more nodes of the local subgroup.

11. The computer-implemented method of claim 1, further comprising:

outputting, by the one or more processors, the electronic media content by the player device to at least one the network nodes of the local subgroup during the transitory period.

12. The computer-implemented method of claim 1, further comprising:
analyzing, by the one or more processors, a geographic location of the one or more network nodes; and
based on the analyzing, updating, by the one or more processors, the local subgroup, wherein the updating includes adding an additional network node to the local subgroup or removing at least one of the one or more network nodes from the local subgroup.

13. The computer-implemented method of claim 1, further comprising:
generating, by the one or more processors, a signal based on the one or more packages of the electronic media content; and
outputting, by the one or more processors, the signal to a display screen corresponding to the player device.

14. The computer-implemented method of claim 1, further comprising:
receiving, by the one or more processors, user data corresponding to the users of the one or more network nodes, the user data including the one or more targeted affinities; and
storing, by the one or more processors, the user data as the profile information in one or more user profiles in a data store.

15. The computer-implemented method of claim 1, further comprising:
utilizing, by the one or more processors, a deep neural network to perform the selecting the one or more packages of electronic media content.

16. The computer-implemented method of claim 1, wherein the one or more targeted affinities include one or more user preferences based on: a shared media content interest, a demographic profile similarity, a common destination, or a prior social connection.

17. A non-transitory computer-readable medium storing instructions that, when executed by at least one processor, cause the at least one processor to perform operations for a peer-to-peer network, the operations comprising:
determining a local subgroup of one or more network nodes by identifying users of the one or more network nodes sharing one or more targeted affinities;
selecting one or more packages of electronic media content for delivery to at least one of the network nodes of the local subgroup based on profile information for each of the identified users or based on trip information stored for at least one local subgroup profile; and
transmitting the one or more packages of electronic media content held in one or more of the network nodes to a player device associated with one of the users of at least one of the network nodes of the local subgroup for a transitory period.

18. A computer system for a peer-to-peer network, the computer system comprising:
at least one memory storing instructions; and
at least one processor configured to execute the instructions to perform operations comprising:
determining, by one or more processors, a local subgroup of one or more network nodes by identifying users of the one or more network nodes sharing one or more targeted affinities;
selecting, by the one or more processors, one or more packages of electronic media content for delivery to at least one of the network nodes of the local subgroup based on profile information for each of the identified users or based on trip information stored for at least one local subgroup profile; and
transmitting, by the one or more processors, the one or more packages of electronic media content held in one or more of the network nodes to a player device associated with one of the users of at least one of the network nodes of the local subgroup for a transitory period.

19. The computer system of claim 18, the operations further comprising:
receiving, by the one or more processors, user data corresponding to the users of the one or more network nodes, the user data including the one or more targeted affinities; and
storing, by the one or more processors, the user data as the profile information in one or more user profiles in a data store.

20. The computer system of claim 18, the operations further comprising:
utilizing, by the one or more processors, a deep neural network to perform the selecting the one or more packages of electronic media content.

* * * * *